US012745306B2

(12) United States Patent
Dong

(10) Patent No.: US 12,745,306 B2
(45) Date of Patent: Sep. 22, 2026

(54) COMMUNICATION METHOD AND COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 293 days.

(21) Appl. No.: 18/567,563

(22) PCT Filed: Jun. 15, 2021

(86) PCT No.: PCT/CN2021/100081
§ 371 (c)(1),
(2) Date: Dec. 6, 2023

(87) PCT Pub. No.: WO2022/261821
PCT Pub. Date: Dec. 22, 2022

(65) Prior Publication Data

US 2024/0284540 A1 Aug. 22, 2024

(51) Int. Cl.
*H04W 76/20* (2018.01)
*H04W 16/14* (2009.01)
*H04W 84/12* (2009.01)

(52) U.S. Cl.
CPC .......... *H04W 76/20* (2018.02); *H04W 16/14* (2013.01); *H04W 84/12* (2013.01)

(58) Field of Classification Search
CPC .................................................. H04W 72/541
See application file for complete search history.

(56) References Cited

U.S. PATENT DOCUMENTS 7,002,947 B1 * 2/2006 McFarland .......... H04W 74/08 370/348
2016/0050691 A1 * 2/2016 Jauh ................. H04W 74/0808 370/252
2023/0083503 A1 * 3/2023 Han ..................... H04W 76/15 370/328

FOREIGN PATENT DOCUMENTS

CN 112566272 A 3/2021
EP 3793314 A1 3/2021
WO 2017105546 A1 6/2017
WO 2021091231 A1 5/2021

OTHER PUBLICATIONS

International Search Report and Written Opinion of International Application No. PCT/CN2021/100081, dated Mar. 16, 2022, 12 pages.

(Continued)

*Primary Examiner* — Pamit Kaur
(74) *Attorney, Agent, or Firm* — Finnegan, Henderson, Farabow, Garrett & Dunner, L.L.P.

(57) ABSTRACT

A method for communication is performed by a station supporting multi-link communication, includes: sensing a first link and a second link, wherein the first link and the second link belong to a non-simultaneous transmit and receive (NSTR) link pair, and the first link is a link to be used for data transmission in the NSTR link pair; judging whether a channel of the first link is busy based on the sensing of the first link; and determining whether to judge a channel state of the second link based on the judged result of the first link.

18 Claims, 2 Drawing Sheets

(56) References Cited

OTHER PUBLICATIONS

The First Office Action issued by the State Intellectual Property Office of People's Republic of China on Mar. 31, 2025, in corresponding Application No. CN 202180001792.2, 17 pages.

Extended European Search Report issued in Application No. 21945414.7 dated Jun. 18, 2024, 6 pages.

The Second Office Action for Chinese Application No. 202180001792.2, dated Sep. 5, 2025, 17 pages.

* cited by examiner apparatus for communication 500 transceiver module 510 processing module 520

COMMUNICATION METHOD AND COMMUNICATION APPARATUS

CROSS-REFERENCE TO RELATED APPLICATIONS

This application is the US national phase application of International Application No. PCT/CN2021/100081, filed on Jun. 15, 2021, the entire contents of which are incorporated herein by reference.

TECHNICAL FIELD

The present disclosure relates to a field of wireless communication technologies, and particularly to a method and an apparatus for communication.

BACKGROUND

A current research scope of Wi-Fi technology is 320 MHz bandwidth transmission, and an aggregation and coordination of multiple frequency bands, etc. A rate and throughput is expected to increase by at least four times with respect to the existing standard. Its main application scenarios are a video transmission, Augmented Reality (AR), Virtual Reality (VR), etc.

The aggregation and coordination of multiple frequency bands refers to a simultaneous communication between devices in the 2.4 GHz, 5.8 GHz and 6-7 GHz frequency bands. For simultaneous communication between devices in multiple frequency bands, a new Media Access Control (MAC) mechanism is defined for management. In addition, it is also expected that the aggregation and coordination of the multiple frequency bands can support low-latency transmission.

A current multi-band aggregation and system technology will support a maximum bandwidth of 320 MHZ (160 MHz+160 MHz), and may also support 240 MHz (160 MHz+80 MHz) and other bandwidths supported by the existing standards.

The currently researched Wi-Fi technology would support multi-link communication. For example, an access point (AP) and a station (STA) included in a current wireless communication system may be multi-link devices (MLDs), that is, they supports the function of transmitting and/or receiving on the multi-links. Therefore, there may be multiple links between the AP MLD and the non-AP STA MLD.

SUMMARY

According to a first aspect of embodiments of the present disclosure, there is provided a method for communication. The method for communication can be applied to a station supporting multi-link communication, and includes: sensing a first link and a second link, in which the first link and the second link belong to a non-simultaneous transmit and receive (NSTR) link pair, in which the first link is a connection to be used for data transmission in the NSTR link pair; judging whether a channel of the first link is busy based on the sensing of the first link; and determining whether to judge a channel state of the second link based on the judged result.

According to a second aspect of embodiments of the present disclosure, there is provided a station supporting multi-link communication. The station includes a processor, and a memory storing a computer program executable by the processor. The processor is configured to: sense a first link and a second link, in which the first link and the second link belong to a non-simultaneous transmit and receive link pair, and the first link is a link to be used for data transmission in the link pair; judge whether a channel of the first link is busy based on the sensing of the first link; and determine whether to judge a channel state of the second link based on the judged result for the first link.

According to a third aspect of embodiments of the present disclosure, there is provided a non-transitory computer-readable storage medium. A computer program is stored on the computer readable storage medium. The computer program, when executed by a processor of a station supporting multi-link communication, causes the station to perform a method for communication. The method includes: sensing a first link and a second link, in which the first link and the second link belong to a non-simultaneous transmit and receive (NSTR) link pair, in which the first link is a connection to be used for data transmission in the NSTR link pair; judging whether a channel of the first link is busy based on the sensing of the first link; and determining whether to judge a channel state of the second link based on the judged result.

BRIEF DESCRIPTION OF THE DRAWINGS

The above and other features of embodiments of the present disclosure will be more apparent by describing in detail example embodiments of the present disclosure with reference to the accompanying drawings.

DETAILED DESCRIPTION

The following description with reference to the accompanying drawings is provided to assist in a comprehensive understanding of various embodiments of the present disclosure as defined by the appended claims and their equivalents. Various embodiments of the present disclosure include various specific details, but these are to be regarded as exemplary only. In addition, descriptions of well-known technologies, functions, and constructions may be omitted for clarity and conciseness.

The terms and words used in the present disclosure are not limited to the bibliographical meanings, but are merely used by the inventor to enable a clear and consistent understanding of the present disclosure. Accordingly, the description of various embodiments of the present disclosure, for those skilled in the art, is provided for purposes of illustration only and not for purposes of limitation.

It should be understood that as used herein, singular forms "a", "an", "said" and "the" may include plural forms unless the context clearly dictates otherwise. It should be further understood that the word "comprise" used in the present disclosure refers to the presence of described features, integers, steps, operations, elements and/or components, but does not exclude the presence or addition of one or more other features, integers, steps, operations, elements, components and/or groups thereof.

It will be understood that, although the terms "first", "second", etc. may be used herein to describe various elements, these elements should not be limited by these terms. These terms are only used to distinguish one element from another. Thus, a first element discussed below could be referred to as a second element without departing from the teachings of example embodiments.

It would be understood that when an element is referred to as being "connected" or "coupled" to another element, it can be directly connected or coupled to the other element or an intermediate element may also be present. Additionally, "connected" or "coupled" as used herein may include wireless connection or wireless coupling. The term "and/or" or the expression "at least one of" as used herein include any and all combinations of one or more of the associated listed items.

Unless otherwise defined, all terms (including technical terms and scientific terms) used herein have the same meaning as commonly understood by one of ordinary skill in the art to which the present disclosure belongs.

Figure 1:
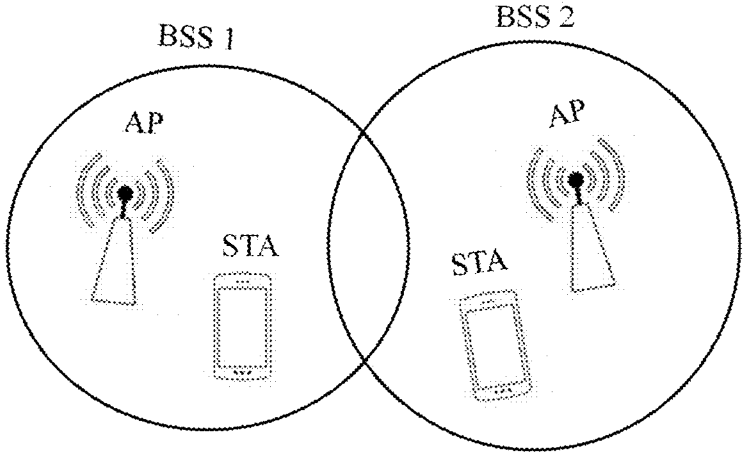
FIG. 1 is an exemplary diagram illustrating a wireless communication scenario according to an embodiment.

FIG. 1 is an exemplary diagram illustrating a wireless communication scenario according to an embodiment.

A basic service set (BSS) may consist of an AP and one or more stations (STAs) communicating with the AP. A basic service set can be connected to a distribution system (DS) through its AP, or can be connected to another basic service set to form an extended service set (ESS).

In a wireless communication environment, usually multiple BSSs, such as BSS 1 and BSS 2 shown in FIG. 1, can exist. Each BSS may include an access point and one or more stations. In FIG. 1, for conciseness of description, an example in which each BSS includes an access point and a station is shown. However, it will be understood that the number of basic service sets, and the number of access points and stations in each basic service set shown in FIG. 1 are only exemplary, and the embodiments of the present disclosure are not limited thereto.

An AP is a wireless switch for a wireless network and is also a core of a wireless network. The AP device can be used as a wireless base station, mainly used as a bridge for connecting a wireless network and a wired network. With the access point AP, the wired and wireless networks can be integrated.

The AP may include a software application and/or circuitry to enable other types of nodes in the wireless network to communicate with the outside and inside of the wireless network through the AP. In some examples, as an example, the AP may be a terminal device or a network device equipped with a Wi-Fi (Wireless Fidelity) chip.

As examples, the station may include, but is not limited to: a cellular phone, a smart phone, a wearable device, a computer, a personal digital assistant (PDA), a personal communication system (PCS) device, a personal information manager (PIM), a personal navigation device (PND)), a GPS, a multimedia device, an Internet of Things (IoT) device, etc.

In an embodiment of the present disclosure, the AP and STAn in each BSS may support multi-link devices, for example, may be denoted as AP MLD and non-AP STA MLD, respectively. For example only, the AP MLD may represent an access point supporting the multi-link communication function, and the non-AP STA MLD may represent a station supporting the multi-link communication function. In this case, the APs and STAs in the BSS1 and BSS2 shown in FIG. 1 can be denoted as AP MLDs and non-AP STA MLDs respectively, which can communicate on multiple links. In addition, the AP MLD in BSS1 can also communicate with the AP MLD or non-AP STA MLD in BSS2 on multiple links. For ease of description, an example of one AP MLD and one non-AP STA MLD is shown in each BSS shown in FIG. 1, but embodiments of the present disclosure are not limited thereto. For example, each BSS may include different numbers of AP MLDs and non-AP STA MLDs according to an actual communication environment.

Figure 2:
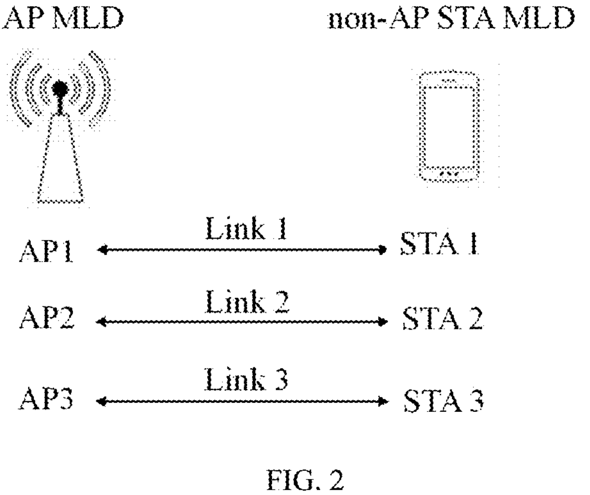
FIG. 2 is an exemplary diagram illustrating multi-link communication according to an embodiment.

FIG. 2 shows a specific example in which the AP MLD communicates with the non-AP STA MLD over multiple links (for example, Link 1 to Link 3), according to an embodiment. Referring to FIG. 2, the AP MLD can operate in three links, such as AP1, AP2 and AP3 shown in FIG. 2, and the non-AP STA MLD can also operate in three links, such as STA1, STA2 and STA3. In the example in FIG. 2, it is assumed that AP1 communicates with STA1 via the corresponding first link Link 1. Similarly, AP2 and AP3 communicate with STA2 and STA3 via the second link Link 2 and the third link Link 3 respectively. In addition, Link 1 to Link 3 may be multiple links of different frequencies, for example, links of 2.4 GHz, 5 GHZ, and 6 GHz, or several links of the same or different bandwidths at 2.4 GHZ, 5 GHZ, and 6 GHZ. In addition, multiple channels may exist on each link. However, it should be understood that the communication scenario shown in FIG. 2 is only exemplary, and the inventive concept is not limited thereto. For example, the AP MLD may be connected to multiple non-AP STA MLDs, or the AP can communicate with several other types of stations on each link.

When access points in multiple BSSs are densely deployed in a wireless communication environment, there may be overlapping coverage between basic service sets (for example, overlapping basic service sets (OBSSs), resulting in communication interference Therefore, space reuse (SR) technology is introduced to improve communication efficiency and spectrum utilization.

In the multi-link communication, there can be two types of non-AP STA MLDs, namely, a simultaneous transmit and receive (STR) non-AP STA MLD (referred to as "STR non-AP STA MLD"), and a non-simultaneous transmit and receive (NSTR) non-AP STA MLD (referred to as "NSTR non-AP STA MLD"). The STR non-AP STA MLD can transmit and receive on multiple links at the same time; the NSTR non-AP STA MLD cannot transmit and receive on multiple links at the same time. Specifically, for the NSTR non-AP STA MLD, there is an NSTR pair (that is, a non-simultaneous transmit and receive link pair) among the multiple links supported by the non-AP STA MLD. Among at least two links of the NSTR pair, when a reception (or transmission) is being performed on a link belonging to the NSTR pair, no transmission (or reception) shall be performed on any of the links belonging to the NSTR link pair. In addition, whenever the NSTR non-AP STA MLD is to transmit simultaneously on at least two links, it needs to be satisfied that: the at least two links are idle at the same time and the transmissions on the at least two links arrive at a receiver at the same time. As a non-limiting example, in a case that the non-AP STA MLD in FIG. 2 supports the NSTR, and Link 1 to Link 3 form the NSTR pair, when transmission and/or reception is performed on Link 1, no reception and/or transmission can be performed on Link 2 and Link 3. Currently, there is a lack of multi-link communication schemes that apply the SR mechanism to non-AP STA MLDs including NSTR capabilities.

Figure 3:
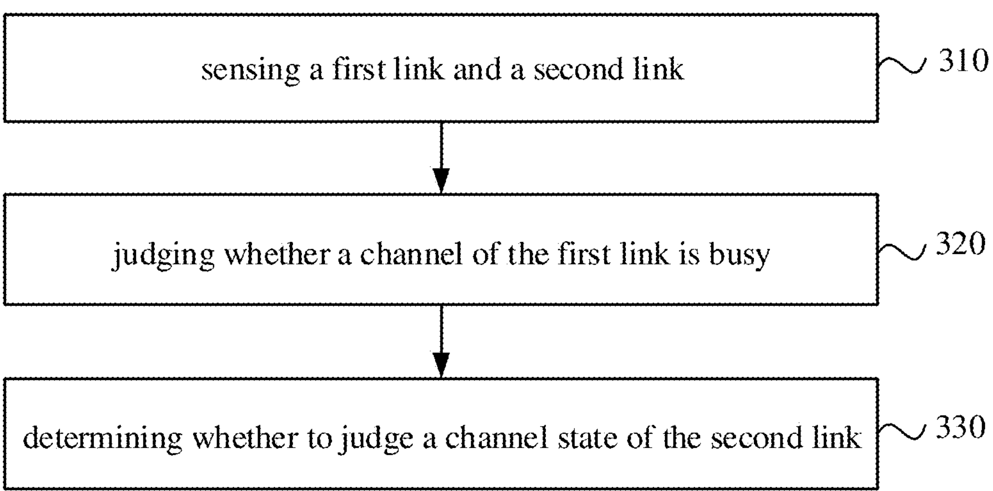
FIG. 3 is a flowchart illustrating a method for communication according to an embodiment.

FIG. 3 is a flowchart illustrating a method for communication according to an embodiment. The method for communication shown in FIG. 3 can be applied to a station supporting multi-link communication (i.e., non-AP STA MLD).

According to the embodiment of the present disclosure, the non-AP STA MLD supports the NSTR capability and includes the NSTR pair. The NSTR pair may be at least two of the multiple links supported by the non-AP STA MLD for multi-link communication.

Referring to FIG. 3, in step 310, a first link and a second link may be sensed. According to the embodiment, the first link and the second link belong to the NSTR link pair. The first link may be a first link (also referred to as "the present link") in the NSTR pair that will be used for data transmission. The second link may be another link in the NSTR pair in addition to the first link. According to an embodiment of the present disclosure, the first link and the second link may be sensed based on signals received on the first link and the second link. This will be described in detail later with reference to FIG. 4.

In step 320, based on the sensing of the first link, it is judged whether a channel of the first link is busy. In step 330, based on the result judged in step 320, it is determined whether to judge a channel state of the second link. When it is determined in step 320 that the channel of the first link is busy, regardless of the channel state of the second link (whether the second link is busy or not), it is determined not to transmit data on the first link. When it is determined in step 320 that the channel of the first link is idle (not busy), it may be further judged whether a channel of the second link is busy based on the sensing of the second link, and then it is determined whether to perform data transmission on the first link according to the judged result, which will be described in detail below with reference to FIG. 4.

Figures 4, 5:
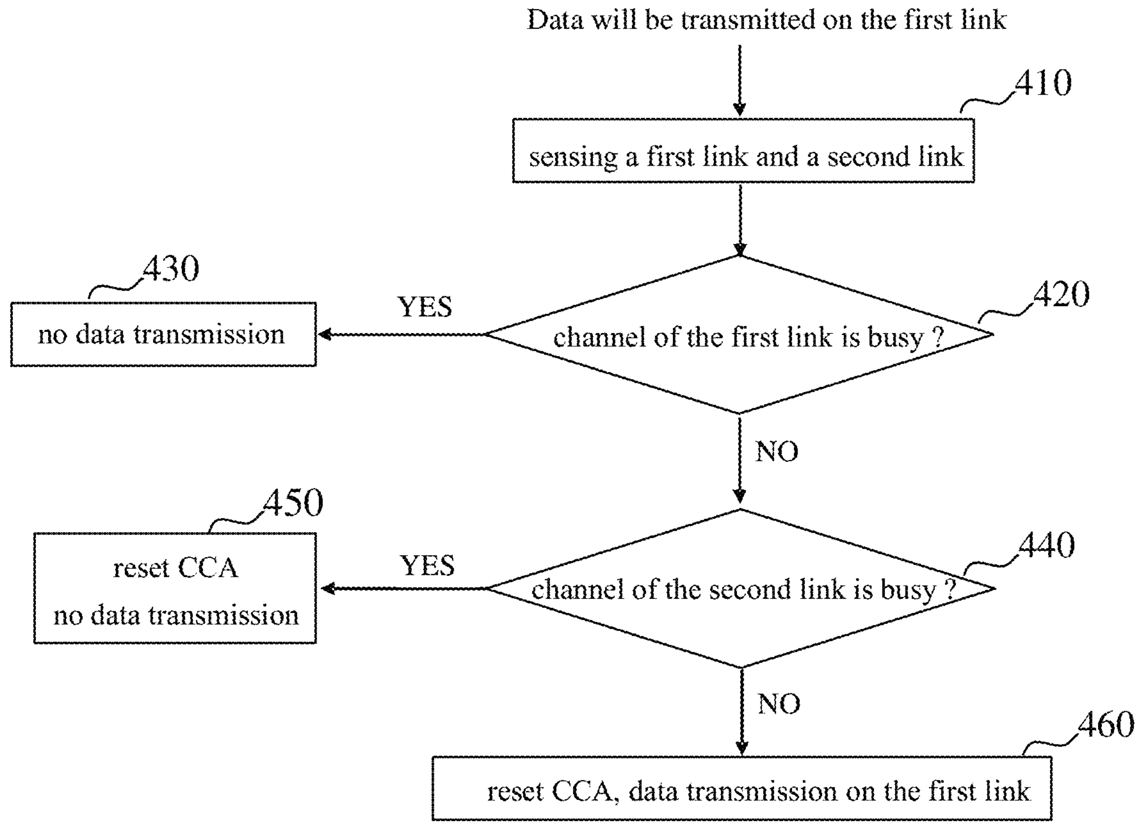
FIG. 4 is a flowchart illustrating a method for communication according to an embodiment.
FIG. 5 is a block diagram illustrating an apparatus for communication according to an embodiment.

Referring to FIG. 4, in a case that STA of non-AP STA MLD will transmit data on a link (a first link), operations may be performed according to steps 410 to 460.

In step 410, a first link and a second link may be sensed, in other words, channel states of the first link and the second link may be sensed. For example, the first link and the second link may be sensed based on signals received on the first link and the second link.

In an embodiment, the channel state of the first link may be sensed according to a first Physical layer Protocol Data Unit (PPDU) received on the first link. That is, sensing the first link may include: determining information on the first PPDU received on the first link. For example, the first PPDU is a PPDU received via the physical layer before performing data transmission on the first link.

According to the embodiment of the present disclosure, the information on the first PPDU received on the first link may refer to a type of the first PPDU. As a non-limiting example, the type of the first PPDU may be represented by a spatial reuse group (SRG) BSS identification information (for example, SRG BSS color bitmap). For example, a group of BSSs with a specific BSS color may be referred to as an SRG. For example, the type of the first PPDU may include an Inter-PPDU and an Intra-PPDU. According to an embodiment of the present disclosure, the Inter-PPDU means that the first PDDU is an inter-basic service set frame, in other words, SRG BSS identification information of the access point transmitting the first PPDU is different from SRG BSS identification information of the station corresponding to the first link. According to an embodiment of the present disclosure, the Intra-PPDU means that the first PDDU is an intra-basic service set frame, in other words, SRG BSS identification information of the access point transmitting the first PPDU is the same as SRG BSS identification information of the station corresponding to the first link. For example, the SRG BSS identification information may be located in a signal domain part of a physical header of the PPDU.

According to an embodiment of the present disclosure, for the first link that will be used for data transmission, the information of the first PPDU received on the first link is determined, to realize the sensing of the first link. For example, it may be determined whether the first PPDU is an inter-basic service set frame (Inter-PPDU) or an intra-basic service set frame (Intra-PPDU) according to the SRG BSS identification information.

According to an embodiment of the present disclosure, sensing the second link may include sensing a second PPDU received on the second link, for example, sensing whether the second PPDU is being received, information of a transmitter and receiver of the second PPDU, etc.

In step 420, it may be judged whether a channel of the first link is busy. The judgment may be made based on the sensed result in step 410, for example, based on the determined information on the first PPDU described in step 410, it may be judged whether the channel of the first link is busy, so as to decide whether to transmit on the channel of the first link after the judgment.

In one embodiment of the present disclosure, in response to the determined information on the first PPDU indicating that the first PPDU is an inter-basic service set frame (Inter-PPDU), it is determined that the channel of the first link is busy (that is, "Yes" in step 420), and in step 430, there is no need to judge the channel state of the second link, and no data transmission is performed on the first link. According to an embodiment of the present disclosure, in a case that the first PPDU is an Inter-PPDU, it may be directly determined that the channel of the first link is busy, and since the channel of the first link is determined to be busy, data transmission cannot be performed on the first link. In this case, the first link may be directly reported to MAC layer from the physical layer as busy, so that the MAC layer can be reconfigured without further judgment on the channel state of other links in the NSTR pair, which can improve the response speed of the system.

In another embodiment of the present disclosure, in response to the determined information indicating that the first PPDU is an intra-basic service set frame (Intra-PPDU), it may be judged based on an interference level of receiving the first PPDU that the channel of the first link is busy or idle. In embodiments of the present disclosure, "idle" and "busy" are relative. When the first PPDU is an Intra-PPDU, the channel state of the first link cannot be directly determined, and the channel state of the first link needs to be further determined based on the interference level of the received first PPDU. According to an embodiment of the present disclosure, the interference level may be determined according to a level of SRG/Non-SRG PD. For example, the interference level may be determined according to the transmit power of the first PPDU, the signal strength of the first PPDU received on the first link, etc. Then the interference level is compared with a preset threshold value, when the interference level is less than the threshold value, it may be determined that the channel of the first link is idle, that is, "No" in step 420, thereby step 440 may be performed; when the interference level is greater than or equal to the threshold value, then it may be determined that the channel of the first link is busy, that is, "Yes" in step 420, and thereby step 430 may be performed. Step 430 has been described above, in order to avoid redundancy, repeated description is omitted here.

In response to the channel of the first link being idle ("No" in step 420), in step 440, it is judged whether the channel of the second link is busy. For example, in response to the channel of the first link being idle, based on the sensing of the second link, it is judged whether the channel of the second link is busy. Since the non-AP STA MLD in FIG. 4 supports the NSTR capability, when it is expected to transmit data on the idle first link, it needs to ensure that no data transmission is performed on other links of the NSTR pair, that is, the channel sate of the second link needs to be sensed and judged. According to the embodiment of the present disclosure, judging whether the channel of the second link is busy in step 440 may include: judging whether a second PPDU is received on the second link. When the second PPDU is not received on the second link, it may be directly determined that the second link is idle, and step 460 may be performed; when the second PPDU is received on the second link, it may be further determined whether the channel of the second link is busy according to the received information of the second PPDU. For example, the channel state of the second link may be determined according to a receiver of the second PPDU.

In one embodiment of the present disclosure, in response to receiving the second PPDU on the second link, and a device receiving the second PPDU and a device receiving the first PPDU are affiliated with a same station supporting multi-link communication, the channel of the second link is determined as busy ("Yes" in step 440), and in step 450, no data transmission is performed on the first link. That is, when a non-AP STA MLD with which a STA receiving the second PPDU on the second link is affiliated is the same as a non-AP STA MLD with which a STA to be used for data transmission on the first link is affiliated, because of the limitation of the NSTR capability of the non-AP STA MLD, a station for the non-AP STA MLD cannot transmit data on the first link when receiving data on the second link. In addition, in step 450, clear channel assessment (CCA) may be reset. According to an embodiment, the clear channel assessment may be reset based on the sending of the channel of the second link, for example, parameters related to CCA (such as timers, CCA thresholds, etc.) may be reset. For example, when the channel of the second link is sensed as busy, a timer on the first link may be reset based on a sensed channel busy duration of the second link, so that after the transmission on the second channel is completed, the sensing of the channel of the first link and the channel of the second link is further performed.

In another embodiment of the present disclosure, in response to receiving the second PPDU on the second link, and a device receiving the second PPDU and a device receiving the first PPDU are affiliated with a same station supporting multi-link communication, the channel of the second link is determined as idle ("No" in step 440), and in step 460, the data transmission is performed on the first link. For example, the second link may be shared by two non-AP STA MLDs, when a non-AP STA MLD with which a STA receiving the second PPDU on the second link is affiliated is different from a non-AP STA MLD with which a STA to be used for data transmission on the first link is affiliated, it may be determined that the non-AP STA MLD with which the STA to be used for data transmission on the first link is affiliated has not received on other links of the NSTR pair, so although the PPDU is received on the second link, the limitation of NSTR capability can be ignored, and data may be transmitted on the first link, thereby implementing the SR mechanism. Furthermore, in step 460, the clear channel assessment (parameters about CCA) may be reset based on the sensing of the channel of the second link, for example but not limited to, resetting a timer on the first link.

It will be understood that although in FIG. 4, the reception of the PPDU (receiving the second PPDU on the second link) is described as an example, the present disclosure is not limited thereto, and the method for communication of the present disclosure can also be applied to embodiments of the transmission of the PPDU. For the sake of brevity, repeated descriptions are omitted here.

According to an embodiment of the present disclosure, the first link and the second link may be simultaneously sensed in step 410, and then it is judged in steps 420 and 440 whether the first link and the second link are busy, so as to avoid a potential delay caused by separate sensing and judging (for example, first sensing the first link and judging whether the first link is busy, then sensing the second link and judging whether the second link is busy), which may result in the channel of the second link being occupied by other devices and unable to effectively implement the SR mechanism.

In the embodiments of the present disclosure, an issue of a PHY-CCARESET.request primitive on a link of the NSTR non-AP STA MLD is defined. The PHY-CCARESET.request primitive may be a request primitive transmitted from the MAC layer to the physical layer for reset of channel state detection evaluation mechanism.

For example, in a case that a STA of a non-AP STA MLD will transmit data on a link (hereinafter referred to as "the present link"), and senses that the channel of the present link is busy, and when it determines via the physical layer that the received data is an Inter-PPDU, it determines that the channel of the present link is busy, and it does not perform judgment on other links belonging to the NSTR link pair.

For example, in a case that a STA of a non-AP STA MLD will transmit data on a link, and when it determines via the physical layer that the Intra-PPDU is received, then judges the interference level according to the level of SRG/Non-SRG PD; when the interference level is below the preset threshold, it determines that the channel of the present link is idle; at the same time, when it determines that the PPDUs are being received on other links belonging to the same NSTR link pair, and if the receivers of the PPDUs are the same non-AP STA MLD, it performs CCA reset on the present link, and determines that the channels of the other links are busy.

For example, in a case that a STA of a non-AP STA MLD will transmit data on a link, and when it determines via the physical layer that the Intra-PPDU is received, then judges the interference level according to the level of SRG/Non-SRG PD; when the interference level is below the preset threshold, it determines that the channel of the present link is idle; at the same time, when it determines that the PPDUs are being received on other links belonging to the same NSTR link pair, and if the receivers of the PPDU are not the same non-AP STA MLD, it performs CCA reset on the present link, and determines that the channels of the other links are busy.

The method for communication according to the embodiments of the present disclosure, through sensing and judging the link to transmit data and other links of the NSTR link pair, realizes spatial reuse in multi-link communication, and improves spectrum utilization and system throughput.

FIG. 5 is a block diagram illustrating an apparatus for communication according to an embodiment. The apparatus for communication 500 may include a transceiver module 510 and a processing module 520. The apparatus for communication shown in FIG. 5 can be applied to a station supporting multi-link communication (non-AP STA MLD).

According to an embodiment of the present disclosure, the transceiver module 510 may be configured to: perform receiving and transmitting operations; the processing module 520 may be configured to: sense the first link and the second link, in which the first link and the second link belong to an NSTR link pair, the first link is a link to be used for data transmission in the NSTR link pair; judge whether a channel of the first link is busy based on the sensing of the first link; and determine whether to judge a channel state of the second link based on the judged result.

According to an embodiment of the present disclosure, the processing module 520 is further configured to: determine information on a first PPDU received on the first link; and judge whether the first link is busy based on the determined information. For example, based on the determined information on the first PPDU described in step 410, it may be judged whether the channel of the first link is busy. In order to avoid redundancy, repeated descriptions are omitted here.

According to an embodiment of the present disclosure, the processing module 520 is further configured to: in response to the determined information indicating that the first PPDU is an inter-basic service set frame, determine that the channel of the first link is busy, and not judge the channel state of the second link, and the transceiver module 510 is not used to transmit data on the first link.

According to an embodiment of the present disclosure, the processing module 520 is further configured to: in response to the determined information indicating that the first PPDU is an intra-basic service set frame, determine whether the channel of the first link is busy or idle based on an interference level of receiving the first PPDU.

According to an embodiment of the present disclosure, the processing module 520 is further configured to: in response to the channel of the first link being idle, judge whether the channel of the second link is busy based on the sensing of the second link, in which judging whether the channel of the second link is busy includes: judging whether a second PPDU is received on the second link through the transceiver module 510.

According to an embodiment of the present disclosure, the processing module 520 is further configured to: in response to receiving the second PPDU on the second link, and a device receiving the second PPDU and a device receiving the first PPDU being affiliated with a same station supporting multi-link communication, determine that the channel of the second link is busy, and the transceiver module 510 is not used to transmit data on the first link.

According to an embodiment of the present disclosure, the processing module 520 is further configured to: in response to receiving the second PPDU on the second link, and a device receiving the second PPDU and a device receiving the first PPDU being not affiliated with a same station supporting multi-link communication, determine that the channel of the second link is idle, and the transceiver module 510 is used to transmit data on the first link.

According to an embodiment of the present disclosure, the processing module 520 is further configured to: reset a clear channel assessment based on the sensing of the channel of the second link. This is similar to "reset CCA" in steps 450 and 460, and repeated descriptions are omitted here to avoid redundancy.

The transceiver module 510 and the processing module 520 of the apparatus for communication 500 shown in FIG. 5 can execute the methods for communication described with reference to FIG. 3 and FIG. 4, and repeated descriptions are omitted here for brevity.

It will be understood that the apparatus for communication 500 shown in FIG. 5 is only exemplary, and embodiments of the present disclosure are not limited thereto. For example, the apparatus for communication 500 may also include other modules, such as a memory module and the like. In addition, various modules in the apparatus for communication 500 may be combined into more complex modules, or may be divided into more individual modules.

The method for communication described with reference to FIG. 3 and FIG. 4 and the apparatus for communication described with reference to FIG. 5 can apply a spatial reuse mechanism in a multi-link device to improve spectrum utilization efficiency and system throughput.

Based on the same principle as the method provided by the embodiments of the present disclosure, embodiments of the present disclosure also provide an electronic device. The electronic device includes a processor, a memory stored with machine-readable instructions (may also be referred to as the "computer program"); and a processor configured to execute the machine-readable instructions to implement the methods described with reference to FIGS. 3 and 4.

Embodiments of the present disclosure also provide a computer-readable storage medium, on which a computer program is stored. When the computer program is executed by a processor, the methods described with reference to FIG. 3 and FIG. 4 are implemented.

In embodiments, the processor may be used to implement or execute various exemplary logical blocks, modules and circuits described in conjunction with the present disclosure, for example, a Central Processing Unit (CPU), a DSP (Digital Signal Processor), an Application Specific Integrated Circuit (ASIC), a Field Programmable Gate Array (FPGA) or other programmable logic devices, transistor logic devices, hardware components or any combination thereof. The processor may also be a combination of computing functions, for example, a combination of one or more microprocessors, a combination of DSP and a microprocessor, and the like.

In embodiments, the memory may be, for example, a Read Only Memory (ROM), a Random Access Memory (RAM), an Electrically Erasable Programmable Read Only Memory (EEPROM), a Compact Disc Read Only Memory (CD-ROM) or other optical disc storage, optical disc storage (including compact discs, laser discs, optical discs, digital versatile discs, Blu-ray discs, etc.), magnetic disk storage media or other magnetic discs A storage device, or any other medium that can be used to carry or store program code in the form of instructions or data structures and that can be accessed by a computer, but is not limited thereto.

It should be understood that although the various steps in the flow chart of the accompanying drawings are displayed in sequence according to the arrows, these steps are not necessarily executed in sequence in the order indicated by the arrows. Unless otherwise specified herein, there is no strict order restriction on the execution of these steps, and they can be executed in other orders. In addition, at least some of the steps in the flowcharts of the accompanying drawings may include multiple sub-steps or multiple stages, these sub-steps or stages are not necessarily executed at the same time, but may be executed at different times, and the order of execution is also not necessarily performed sequentially, but may be performed alternately with at least a part of other steps or sub-steps or stages of other steps.

While the present disclosure has been shown and described with reference to certain embodiments thereof, it will be understood by those skilled in the art that various changes in form and details may be made without departing from the scope of the present disclosure. Therefore, the scope of the present disclosure should not be defined by the embodiments, but should be defined by the appended claims and their equivalents.

What is claimed is:

1. A method for communication, performed by a station supporting multi-link communication, comprising:

sensing a first link and a second link, wherein the first link and the second link belong to a non-simultaneous transmit and receive (NSTR) link pair, and the first link is a link to be used for data transmission in the NSTR link pair;

judging whether a channel of the first link is busy based on the sensing of the first link; and determining whether to judge a channel state of the second link based on the judged result of the first link, wherein the method further comprises:

in response to a first physical layer protocol data unit (PPDU) received on the first link being an intra-basic service set (intra-BSS) frame, determining whether the channel of the first link is busy or idle based on an interference level of receiving the first PPDU, in response to the channel of the first link being idle, judging whether a channel of the second link is busy based on the sensing of the second link, wherein judging whether the channel of the second link is busy comprises: judging whether a second PPDU is received on the second link.

2. The method according to claim 1, wherein sensing the first link comprises: determining information on the first PPDU;

wherein judging whether the channel of the first link is busy comprises: judging whether the first link is busy based on the determined information.

3. The method according to claim 2, further comprising:

in response to the determined information indicating that the first PPDU is an inter-basic service set (inter-BSS) frame, determining that the channel of the first link is busy and there is no need to judge the channel state of the second link, and not performing data transmission on the first link.

4. The method according to claim 2, wherein the determined information indicates that the first PPDU is the intra-BSS frame.

5. The method according to claim 1, further comprising:

in response to receiving the second PPDU on the second link, and a device receiving the second PPDU and a device receiving the first PPDU being affiliated with a same station supporting multi-link communication, determining that the channel of the second link is busy, and not performing data transmission on the first link.

6. The method according to claim 1, further comprising:

in response to receiving the second PPDU on the second link, and a device receiving the second PPDU and a device receiving the first PPDU being not affiliated with a same station supporting multi-link communication, determining that the channel of the second link is idle, and performing data transmission on the first link.

7. The method according to claim 1, further comprising: resetting a clear channel assessment based on the sensing of the channel of the second link.

8. The method according to claim 1, further comprising:

in response to not receiving the second PPDU on the second link, determining that the channel of the second link is idle, and performing data transmission on the first link.

9. A station supporting multi-link communication, comprising:

a processor; and a memory storing a computer program executable by the processor, wherein the processor is configured to:

sense a first link and a second link, wherein the first link and the second link belong to a non-simultaneous transmit and receive (NSTR) link pair, and the first link is a link to be used for data transmission in the NSTR link pair;

judge whether a channel of the first link is busy based on the sensing of the first link; and determine whether to judge a channel state of the second link based on the judged result of the first link, wherein the processor is further configured to:

in response to a first physical layer protocol data unit (PPDU) received on the first link being an intra-basic service set (intra-BSS) frame, determine whether the channel of the first link is busy or idle based on an interference level of receiving the first PPDU, in response to the channel of the first link being idle, judge whether a channel of the second link is busy based on the sensing of the second link, wherein judging whether the channel of the second link is busy comprises: judging whether a second PPDU is received on the second link.

10. The station according to claim 9, wherein the processor is further configured to: determine information on the first PPDU;

wherein judging whether the channel of the first link is busy comprises: judging whether the first link is busy based on the determined information.

11. The station according to claim 10, wherein the processor is further configured to:

in response to the determined information indicating that the first PPDU is an inter-basic service set (inter-BSS) frame, determine that the channel of the first link is busy and there is no need to judge the channel state of the second link, and not perform data transmission on the first link.

12. The station according to claim 10, wherein the determined information indicates that the first PPDU is the intra-BSS frame.

13. The station according to claim 9, wherein the processor is further configured to:

in response to not receiving the second PPDU on the second link, determine that the channel of the second link is idle, and perform data transmission on the first link.

14. The station according to claim 9, wherein the processor is further configured to:

in response to receiving the second PPDU on the second link, and a device receiving the second PPDU and a device receiving the first PPDU being affiliated with a same station supporting multi-link communication, determine that the channel of the second link is busy, and not performing data transmission on the first link.

15. The station according to claim 9, wherein the processor is further configured to:

in response to receiving the second PPDU on the second link, and a device receiving the second PPDU and a device receiving the first PPDU being not affiliated with a same station supporting multi-link communication, determine that the channel of the second link is idle, and performing data transmission on the first link.

16. The station according to claim 9, wherein the processor is further configured to:

reset a clear channel assessment based on the sensing of the channel of the second link.

17. A non-transitory computer-readable storage medium having stored thereon a computer program that, when executed by a processor of a station supporting multi-link communication, causes the station to perform a method for communication, the method comprising:

sensing a first link and a second link, wherein the first link and the second link belong to a non-simultaneous transmit and receive (NSTR) link pair, and the first link is a link to be used for data transmission in the NSTR link pair;

judging whether a channel of the first link is busy based on the sensing of the first link; and determining whether to judge a channel state of the second link based on the judged result of the first link, wherein the method further comprises:

in response to a first physical layer protocol data unit (PPDU) received on the first link being an intra-basic service set (intra-BSS) frame, determining whether the channel of the first link is busy or idle based on an interference level of receiving the first PPDU, in response to the channel of the first link being idle, judging whether a channel of the second link is busy based on the sensing of the second link, wherein judging whether the channel of the second link is busy comprises: judging whether a second PPDU is received on the second link.

18. The non-transitory computer-readable storage medium according to claim 17, wherein sensing the first link comprises: determining information on the first PPDU;

wherein judging whether the channel of the first link is busy comprises: judging whether the first link is busy based on the determined information.

* * * * *